United States Patent
Maguire (10) Patent No.: US 9,246,148 B2
(45) Date of Patent: Jan. 26, 2016

(54) SERVICE PANEL FOR ACCESSING A SERVICEABLE PART

(71) Applicant: Ford Global Technologies, LLC, Dearborn, MI (US)

(72) Inventor: Patrick Daniel Maguire, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 167 days.

(21) Appl. No.: 14/030,335

(22) Filed: Sep. 18, 2013

(65) Prior Publication Data

US 2015/0079458 A1  Mar. 19, 2015

(51) Int. Cl.
*H01M 2/02* (2006.01)
*H01M 2/12* (2006.01)
*H01M 2/04* (2006.01)
*H01M 2/10* (2006.01)

(52) U.S. Cl.
CPC .......... *H01M 2/1083* (2013.01); *H01M 2/1294* (2013.01); *H01M 2/0237* (2013.01); *H01M 2/12* (2013.01); *H01M 2220/20* (2013.01); *Y10T 29/49108* (2015.01)

(58) Field of Classification Search
CPC ... H01M 2/10; H01M 2/1077; H01M 2/0237; H01M 2/12; H01M 2/1294; B65D 41/485; B65D 2101/0038
See application file for complete search history.

(56) References Cited

U.S. PATENT DOCUMENTS

| | | | |
|---|---|---|---|
| 3,560,266 A * | 2/1971 | Mossford | 429/75 |
| 4,474,304 A | 10/1984 | Jacobs | |
| 5,636,701 A | 6/1997 | Norman et al. | |
| 6,007,941 A | 12/1999 | Hermann et al. | |
| 6,696,196 B1 * | 2/2004 | Eilers | 429/56 |
| 7,413,097 B1 | 8/2008 | Adams | |
| 2001/0019255 A1 * | 9/2001 | Park | 320/116 |
| 2001/0046622 A1 * | 11/2001 | Barwick | 429/90 |
| 2003/0047366 A1 * | 3/2003 | Andrew et al. | 180/68.5 |
| 2004/0048146 A1 * | 3/2004 | Adamson et al. | 429/83 |
| 2004/0251872 A1 | 12/2004 | Wang et al. | |
| 2008/0233440 A1 * | 9/2008 | Kernene | 429/17 |
| 2010/0129702 A1 * | 5/2010 | Milner | 429/100 |
| 2012/0103714 A1 | 5/2012 | Choi et al. | |
| 2013/0071708 A1 | 3/2013 | Delans | |

* cited by examiner

*Primary Examiner* — Kenneth Douyette
(74) *Attorney, Agent, or Firm* — Carlson, Gaskey & Olds, P.C./Ford (57) ABSTRACT

A battery assembly according to an exemplary aspect of the present disclosure includes, among other things, an enclosure assembly defining an interior and a service panel integrally formed in the enclosure assembly. The service panel includes a ductile portion that is removable to access the interior.

19 Claims, 6 Drawing Sheets

SERVICE PANEL FOR ACCESSING A SERVICEABLE PART

TECHNICAL FIELD

This disclosure relates to a service panel, and more particularly, but not exclusively, to a thermoplastic service panel that is removable to expose a serviceable part.

BACKGROUND

Hybrid electric vehicles (HEV's), plug-in hybrid electric vehicles (PHEV's), battery electric vehicles (BEV's) and other known electrified vehicles differ from conventional motor vehicles in that they employ one or more electric machines in addition or in alternative to an internal combustion engine to drive the vehicle. Electrified vehicles may also be equipped with a battery that stores electrical power for powering the electric machines. In some vehicles, an electric machine may also be employed as a generator that is powered by the internal combustion engine in order to generate electrical power to charge the battery.

Some electric vehicle components, including but not limited to the battery, may be mounted external to the vehicle's body structure. Accordingly, these components must be designed to permit access to serviceable parts located therein while adequately resisting moisture ingress.

SUMMARY

A battery assembly according to an exemplary aspect of the present disclosure includes, among other things, an enclosure assembly defining an interior and a service panel integrally formed in the enclosure assembly. The service panel includes a ductile portion that is removable to access the interior.

In a further non-limiting embodiment of the foregoing battery assembly, the interior accommodates at least one serviceable part.

In a further non-limiting embodiment of either of the foregoing battery assemblies, the enclosure assembly includes a tray made of a first material and a cover made of a second material different from the first material.

In a further non-limiting embodiment of any of the foregoing battery assemblies, the first material is a metal and the second material is a thermoplastic.

In a further non-limiting embodiment of any of the foregoing battery assemblies, the ductile portion includes a tear strip.

In a further non-limiting embodiment of any of the foregoing battery assemblies, a pull tab is connected to the tear strip.

In a further non-limiting embodiment of any of the foregoing battery assemblies, the tear strip is defined by a first groove and a second groove that are molded into a portion of the enclosure assembly.

In a further non-limiting embodiment of any of the foregoing battery assemblies, the service panel includes a center body that is bounded by the tear strip.

In a further non-limiting embodiment of any of the foregoing battery assemblies, the ductile portion includes a perforation.

In a further non-limiting embodiment of any of the foregoing battery assemblies, the perforation circumscribes an outer periphery of a membrane of the service panel.

In a further non-limiting embodiment of any of the foregoing battery assemblies, a replacement panel is configured to reseal the interior after removal of at least the ductile portion.

In a further non-limiting embodiment of any of the foregoing battery assemblies, the ductile portion is irreversibly removable from the enclosure assembly.

An enclosure assembly according to an exemplary aspect of the present disclosure includes, among other things, a housing containing at least one serviceable part, a service panel integrally formed into the housing and the service panel having a ductile portion that is plastically deformable to expose the at least one serviceable part.

In a further non-limiting embodiment of the foregoing assembly, the ductile portion is irreversibly removable from the housing.

In a further non-limiting embodiment of either of the foregoing assemblies, the enclosure assembly is a battery assembly of an electric vehicle.

In a further non-limiting embodiment of any of the foregoing battery assemblies, the ductile portion includes a tear strip.

A method according to another exemplary aspect of the present disclosure includes, among other things, deforming a ductile portion of a service panel of an enclosure assembly and exposing at least one serviceable part housed inside of the enclosure assembly in response to the step of deforming.

In a further non-limiting embodiment of the foregoing method, the method includes, prior to the step of deforming, determining whether the at least one serviceable part requires servicing.

In a further non-limiting embodiment of either of the foregoing methods, the method includes severing a tear strip from the enclosure assembly or tearing a membrane away from the enclosure assembly along a perforation.

In a further non-limiting embodiment of any of the foregoing methods, the method includes replacing at least a portion of the service panel with a replacement panel.

The various features and advantages of this disclosure will become apparent to those skilled in the art from the following detailed description. The drawings that accompany the detailed description can be briefly described as follows.

DETAILED DESCRIPTION

This disclosure relates to a service opening and panel for a battery assembly or other enclosure assembly. The service panels of this disclosure are integrated into an enclosure assembly and include a ductile portion that may be removed to expose one or more serviceable parts located inside the enclosure assembly. Among other features, the enclosure assemblies described herein do not require relatively expensive and complex sealing gaskets, fasteners and other parts to be provided as part of the enclosure cover.

Figure 1:
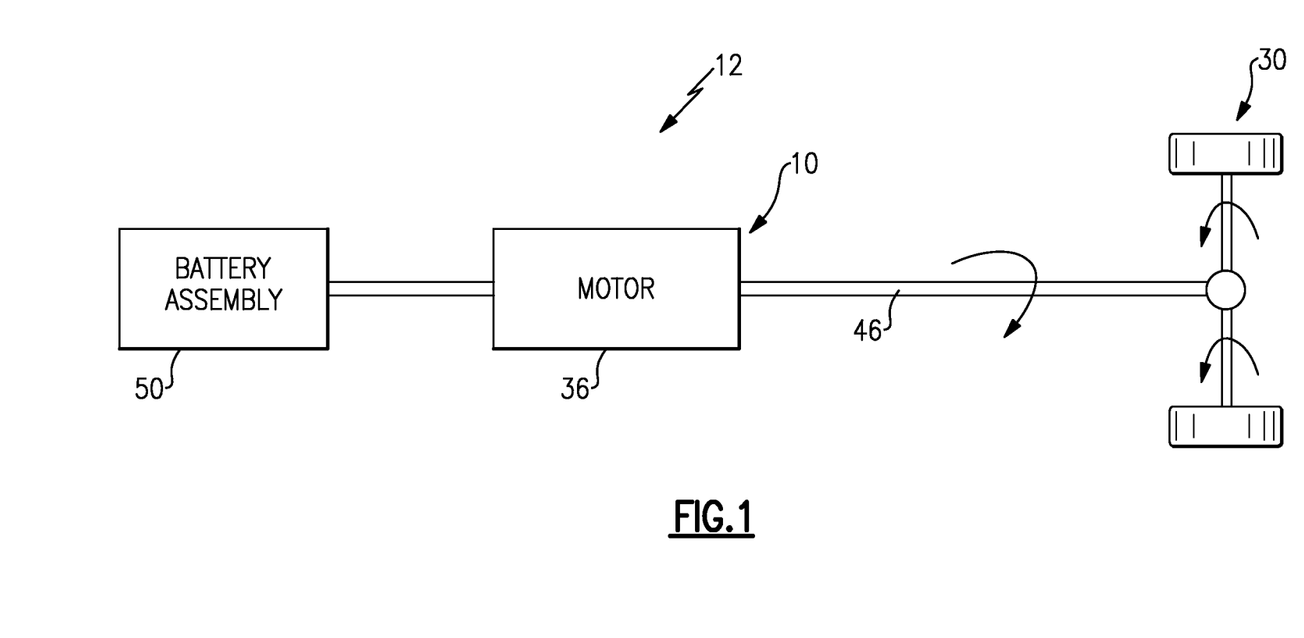
FIG. 1 schematically illustrates a powertrain of an electrified vehicle.

FIG. 1 schematically illustrates a powertrain 10 for an electrified vehicle 12. The electrified vehicle 12 may be a HEV, PHEV or BEV, or any other vehicle. In one embodiment, the powertrain 10 includes a drive system having at least a motor 36 and a battery assembly 50. The drive system generates torque to drive one or more sets of vehicle drive wheels 30 of the electrified vehicle 12. For example, the motor 36 can be employed to drive the vehicle drive wheels 30 by outputting torque to a shaft 46. The battery assembly 50 may be a high voltage battery that is capable of outputting electrical power to operate the motor 36. Of course, this view is highly schematic and it should be appreciated that other devices, such as an internal combustion engine, a generator and/or a power transfer unit, could be incorporated for use with the electrified vehicle 12.

Figure 2:
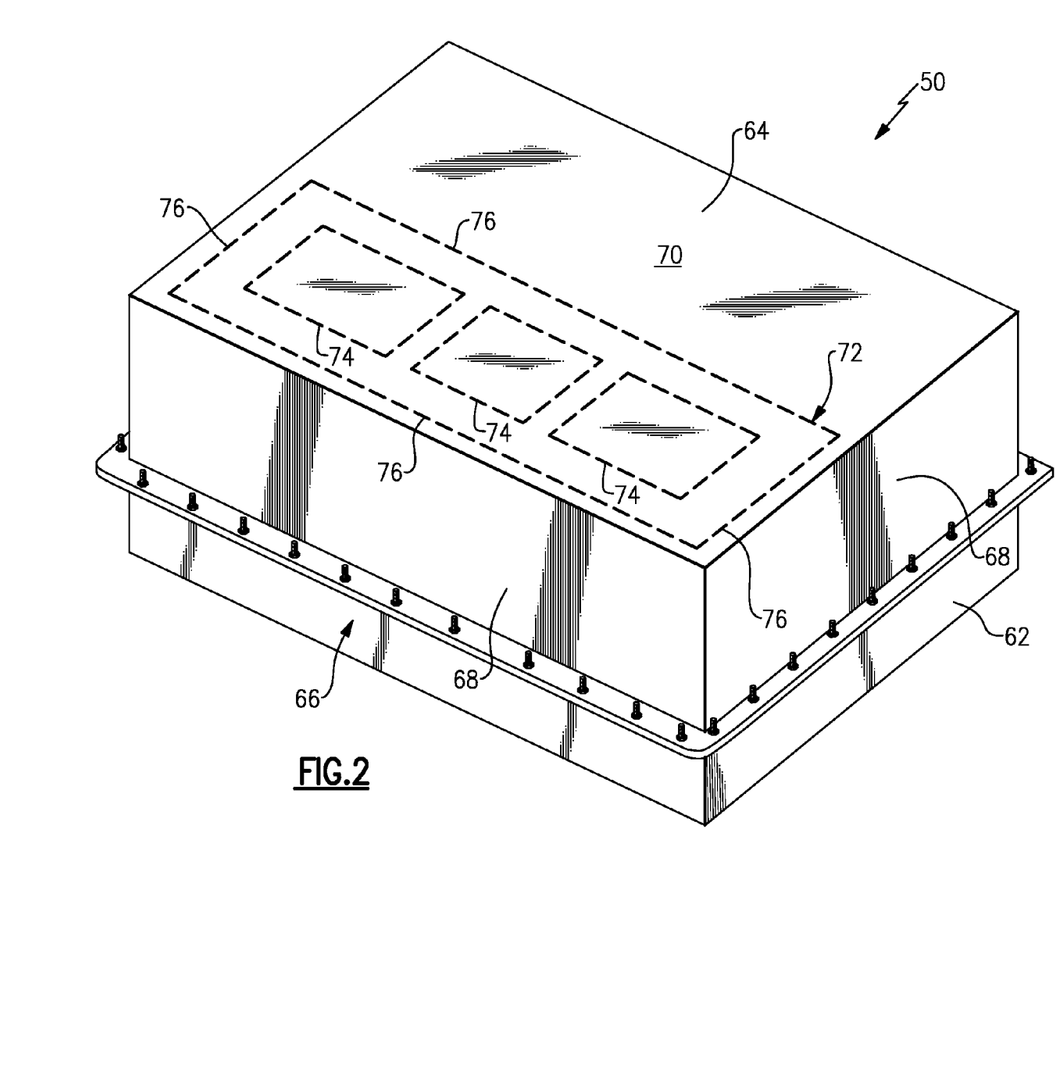
FIG. 2 illustrates a battery assembly of an electric vehicle.

FIG. 2 illustrates a battery assembly 50 that can be incorporated into an electrified vehicle, such as the electrified vehicle 12 of FIG. 1. Among other hardware, the battery assembly 50 may include an enclosure that can house one or more battery cells (not shown) for supplying electrical power to the motor 36 of the electric vehicle 12 (see FIG. 1).

In one embodiment, the battery assembly 50 includes a tray 62 and a cover 64 attached to the tray 62. The tray 62 and cover 64 establish an enclosure assembly that defines an interior 66 for housing various hardware and electronics of the battery assembly 50. In one embodiment, the cover 64 is attached to the tray 62 in a manner that hermetically seals the interior 66. The cover 64 may be attached to the tray 62 in any known manner. For example, the cover 64 could be bolted to the tray 62. Other mechanical attachment mechanisms are also contemplated.

The cover 64 may include sidewalls 68 that extend from a top panel 70 of the cover 64 toward the tray 62. Alternatively, the sidewalls 68 could extend from the tray 62. This disclosure is not limited to the specific battery assembly 50 shown in FIG. 2, and it should be appreciated that the tray 62 and the cover 64 may embody any size, shape or configuration.

In one embodiment, the tray 62 is made of a first material and the cover 64 is made of a second material that is different from the first material. For example, the tray 62 may be made of metal, while the cover 64 is made from a thermoplastic. Exemplary thermoplastics include, but are not limited to, polypropylene (PP) and high density polyethylene (HDPE). In another embodiment, the cover 64 has portions made from metal and other portions made from thermoplastics. In other words, the cover 64 can be a hybrid structure composed of multiple materials.

The battery assembly 50 may additionally include a service panel 72 (shown outlined in dashed lines in FIG. 2). The service panel 72 may embody a variety of sizes and shapes, and may span the entirety of, or across only a portion of, the top panel 70 of the cover 64. In the illustrated embodiment, the service panel 72 is smaller than the top panel 70 of the cover 64.

In one embodiment, the service panel 72 is integrally formed as part of the top panel 70 of the cover 64. At least a portion of the service panel 72 is removable to provide access to the interior 66 of the battery assembly 50. The entirety or a portion of the service panel 72 may be removed to expose one or more serviceable parts 74 housed within the battery assembly 50.

The service panel 72 may include a ductile portion 76 that is removable to access the interior 66 of the battery assembly 50. In this disclosure, the term "ductile portion" is intended to denote a section of the service panel 72 that, once plastically deformed, cannot be reattached to the battery assembly 50 without requiring modifications or the use of additional attachment mechanisms. In one embodiment, the ductile portion 76 is an irreversibly removable portion of the service panel 72.

Figure 3:
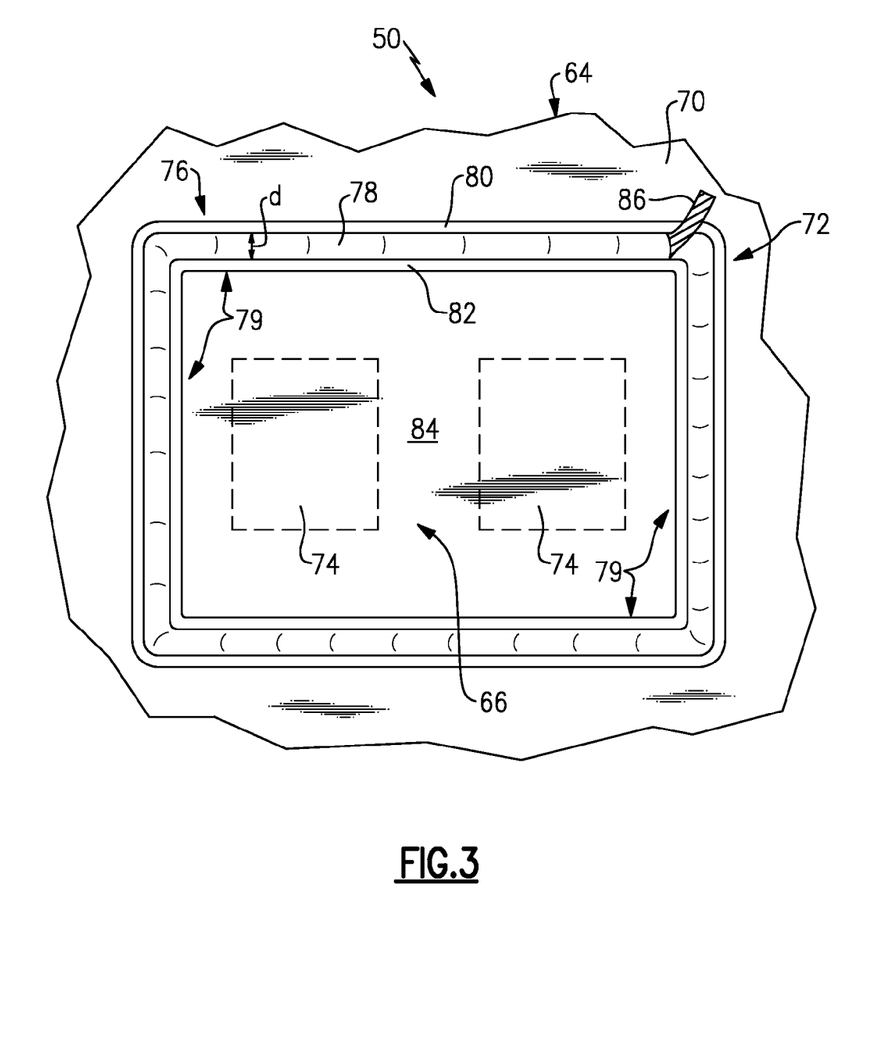
FIG. 3 illustrates a first embodiment of a service panel of a battery assembly.

FIG. 3 illustrates an exemplary service panel 72 that can be incorporated into a battery assembly 50. The service panel 72 is not necessarily shown to the scale it would be in practice and some features may be enlarged to better illustrate their design and operability.

In the illustrated embodiment, the service panel 72 has a ductile portion 76 that includes a tear strip 78 and a center body 84 bounded by the tear strip 78. The tear strip 78 may be defined by a first groove 80 and a second groove 82 that are molded into the service panel 72 or the cover 64 of the battery assembly 50. As discussed in greater detail below, the ductile portion 76 can be plastically deformed, such as by pulling the tear strip 78 to expose the serviceable parts 74 (shown in phantom) housed inside the battery assembly 50.

Figure 8:
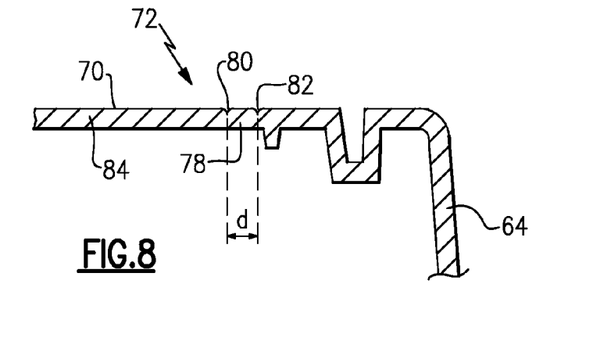
FIG. 8 illustrates a portion of a service panel of a battery assembly.

The first groove 80 and the second grooves 82 may extend in parallel along a surface of the top panel 70 of the cover 64 (shown in cross-section in FIG. 8). Although shown embodying a rectangular shape, the grooves 80, 82 could take the form of other shapes such as circular, square or irregular shapes. The grooves 80, 82 are spaced apart by a distance d. In one embodiment, the distance d is approximately 6 to 10 millimeters (0.24-0.39 inches). However, the first groove 80 and the second groove 82 may be spaced apart any distance. The tear strip 78 is the piece of material that extends across the distance d between the first groove 80 and the second groove 82 to connect the center body 84 to the top panel 70 of the cover 64.

The tear strip 78 may include a pull tab 86 connected to the tear strip 78. In an exemplary embodiment, the pull tab 86 is pulled to exceed the strain capability of the ductile portion 76 of the service panel 72 and begin severing the tear strip 78 from the cover 64. The tear strip 78 is pulled between the two grooves 80, 82 to release the center body 84 from its attachment to the cover 64. The tear strip 78 is pulled completely around a perimeter 79 of the center body 84 until it arrives back to its origin (i.e., the original location of the pull tab 86). The center body 84 may then be removed to expose the serviceable part(s) 74. In one embodiment, the inner groove 82 may not be a complete loop, ending just short of the pull tab 86, such that the center body 84 remains connected to the tear strip 78 and both the tear strip 78 and the center body 84 can be removed as one piece.

Figures 4A, 4B, 4C:
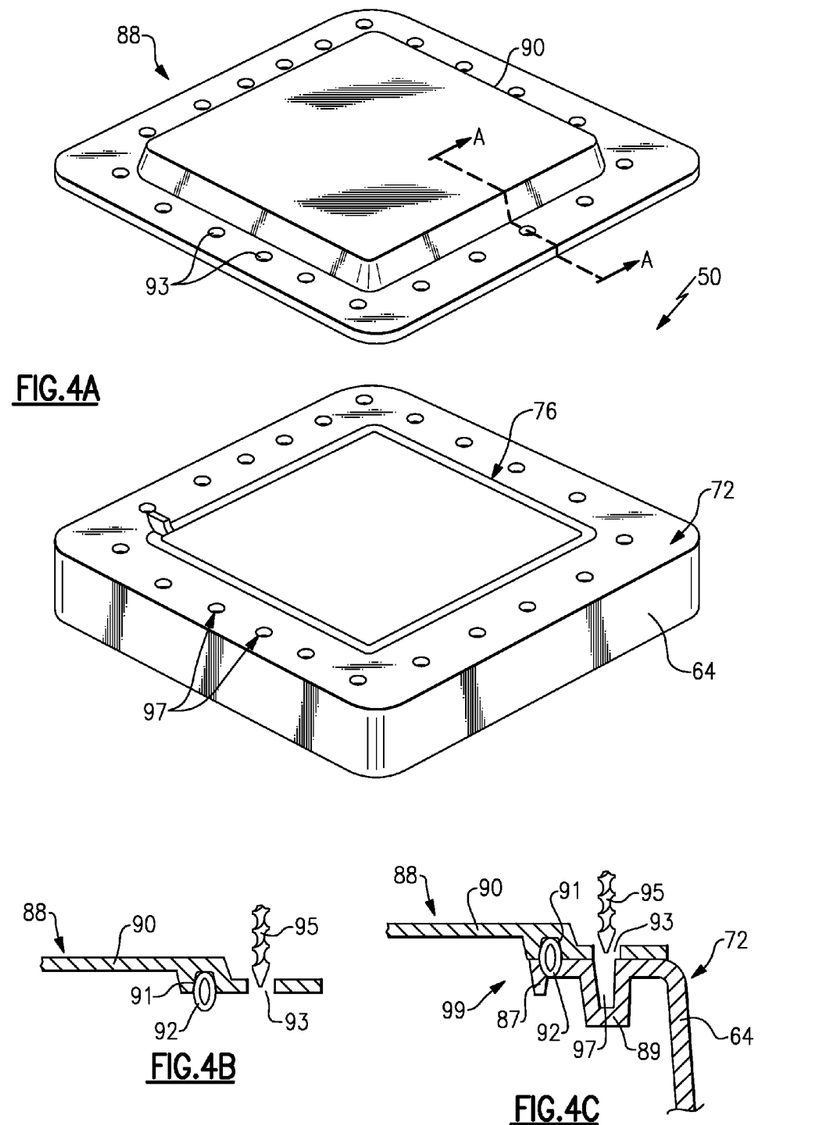
FIGS. 4A, 4B and 4C illustrate a replacement panel of a battery assembly.

FIGS. 4A, 4B and 4C, with continued reference to FIGS. 2-3, illustrate a replacement panel 88 that can be used to seal an opening 99 (see FIGS. 4C and 5) formed in the cover 64 of the battery assembly 50 as a result of plastically deforming the ductile portion 76 of the service panel 72 to expose one or more serviceable part(s). The battery assembly 50 is shown prior to removal of the ductile portion 76 in FIG. 4A. The replacement panel 88 may be positioned over the opening 99 in the cover 64 after removal of at least a portion of the service panel 72 and after the serviceable parts have been serviced (see, for example, FIG. 4C).

The replacement panel 88 includes a cover body 90 and, optionally, at least one seal 92 (see FIGS. 4B and 4C) that can be received between the replacement panel 88 and the cover 64 of the battery assembly 50. In one embodiment, the seal 92 is a gasket seal that is compressed between the replacement panel 88 and the cover 64. However, other seals are also contemplated. The seal 92 may be received within a molded-in recess 91 of the replacement panel 88 (see FIGS. 4B and 4C).

The cover body 90 may include a plurality of cavities 93 that receive fasteners 95 for fixedly attaching the replacement panel 88 to the cover 64. Matching cavities 97 are formed in the cover 64 for receiving the fasteners 95. In one embodiment, the cavities 97 of the cover 64 are molded into the cover 64 and include closed bottoms 89 that allow the replacement panel 88 to be retained without producing a leakage point at the joint between the replacement panel 88 and the cover 64. The cover 64 can additionally include a strengthening rib 87 (see FIG. 4C) to provide structure to the service panel 72 after the ductile portion 76 has been removed. Of course, many alternative designs and configurations of ribs, gussets, wall thicknesses and other features of the replacement panel 88 are contemplated as within the scope of this disclosure.

In one embodiment, the replacement panel 88 is a stand-alone component that is separate and distinct from the service panel 72. In another embodiment, the replacement panel 88 is constructed by recycling the tear strip 78 and/or the center body 84 of the service panel 72. For example, a seal and a retention feature may be added to the center body 84 to construct the replacement panel 88.

Figure 5:
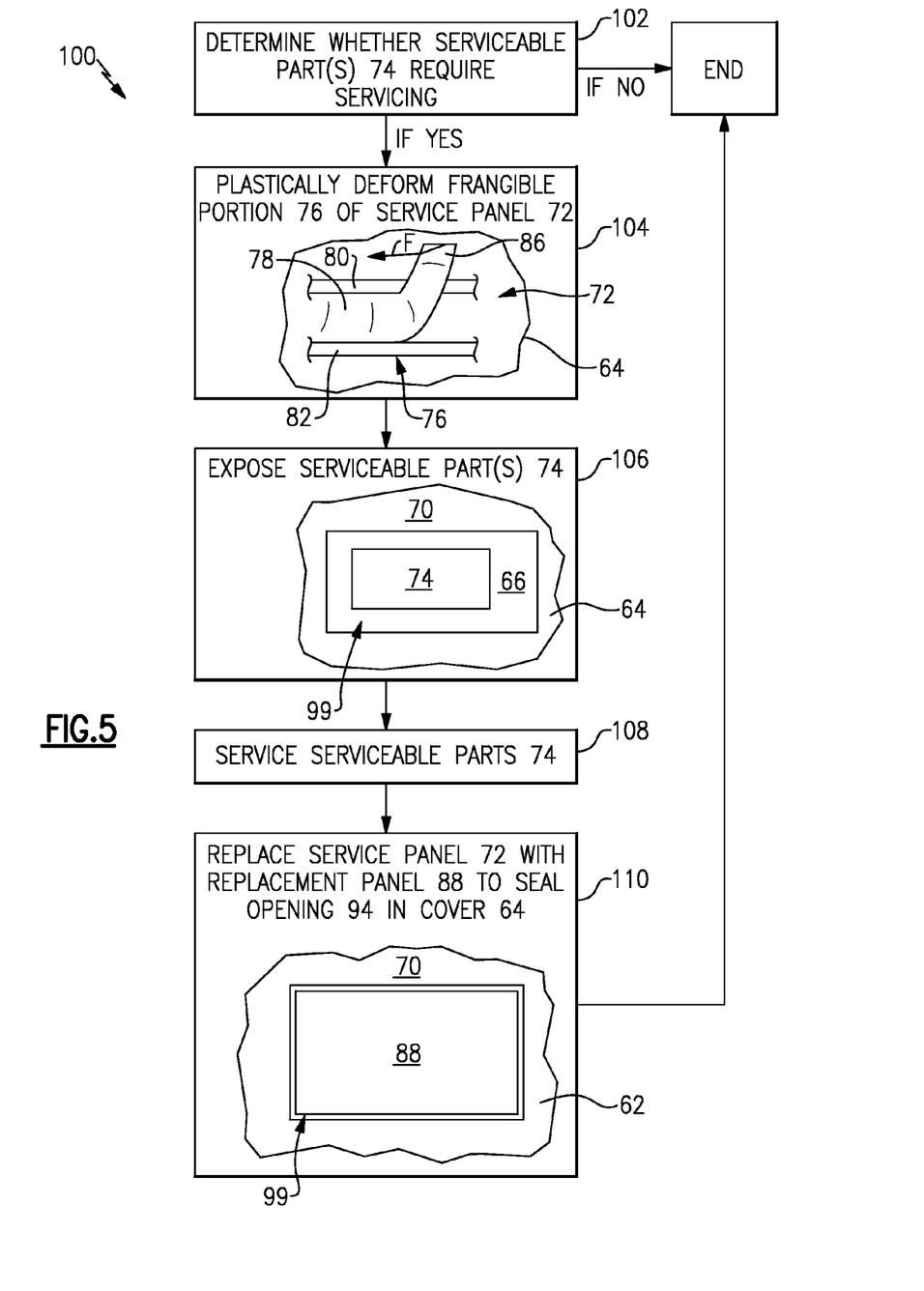
FIG. 5 schematically illustrates a method for providing access to one or more serviceable parts of a battery assembly.

FIG. 5, with continued reference to FIGS. 2, 3 and 4, schematically illustrates a method 100 for accessing the interior 66 of the battery assembly 50. The method begins at step 102 by determining whether a serviceable part 74 of the battery assembly 50 requires servicing. The serviceable part 74 could include one or more of the following parts: a control module, electronics, a BUS electrical center, a fuse, a battery cell, or any other component of the battery assembly 50. Step 102 can be performed manually or electronically by monitoring the health of the battery assembly 50, including the health of its internal components.

The method 100 ends in the event servicing is not required. However, the method proceeds to step 104 if a determination is made that one or more serviceable parts 74 require service. Step 104 includes plastically deforming a ductile portion 76 of a service panel 72 of the battery assembly 50. In one embodiment, plastic deformation is achieved by applying a force, in any direction, to the pull tab 86 that is connected to the tear strip 78. The pull tab 86 may be pre-formed as part of the tear strip 78 or could be formed by a cutting operation that frees an end of the tear strip 78. The pull tab 86 may be moved manually or with a tool to sever the tear strip 78 from the grooves 80, 82.

In one embodiment, a pulling force F is applied to the pull tab 86 (in either direction) until the strain capability of the ductile portion 76 is exceeded. This pulling force F severs the tear strip 78 from the cover 64. The tear strip 78 is pulled around a perimeter 79 of the center body 84 (see FIG. 3) until reaching the original location of the pull tab 86 to completely sever the tear strip 78 from the cover 64.

At step 106, the serviceable part(s) 74 are exposed. In other words, the interior 66 of the battery assembly 50 is accessible in response to plastically deforming the ductile portion 76 during step 104.

Next, at step 108, the exposed serviceable part(s) 74 may be serviced. Any service, including maintenance tasks or part replacement, may be performed during this step.

Finally, at step 110, the battery assembly 50 may be resealed by a replacement panel 88. In one embodiment, the replacement panel 88 is a new part that replaces the service panel 72 or the portions of the service panel 72 previously removed during step 104. In another embodiment, portions of the service panel 72 can be recycled to construct the replacement panel 88. The replacement panel 88 is positioned to cover an opening 99 formed in the cover 64. The opening 99 exists by virtue of removing at least a portion of the service panel 72.

Figure 6:
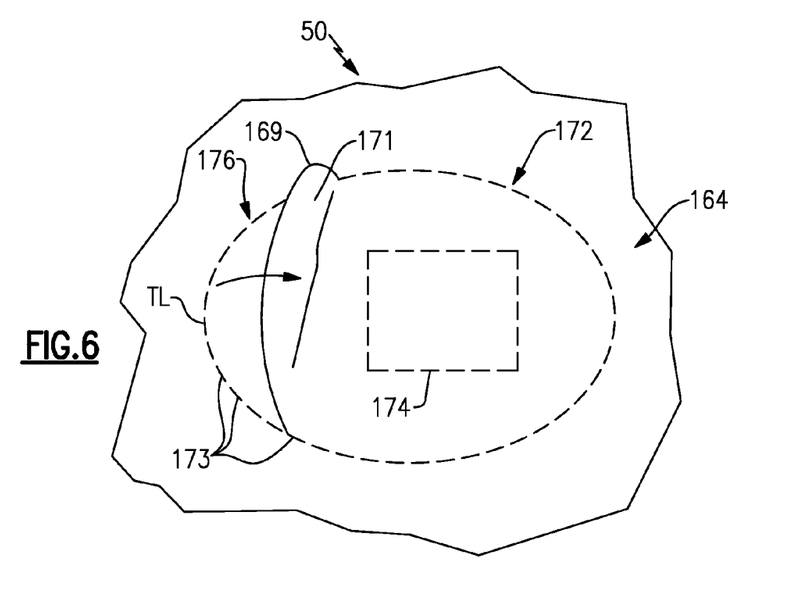
FIG. 6 illustrates a second embodiment of a service panel.

FIG. 6 illustrates another exemplary service panel 172 that may be incorporated into a battery assembly 50. In this disclosure, like reference numbers designate like elements where appropriate and reference numerals with the addition of 100 or multiples thereof designate modified elements that are understood to incorporate the same features and benefits of the corresponding original elements.

In this embodiment, the service panel 172 includes a ductile portion 176 that is defined about an outer periphery 169 of a membrane 171. The ductile portion 176 may include a perforation 173 that weakens the outer periphery 169 such that the membrane 171 can be removed from a cover 164 of the battery assembly 50 to expose a serviceable part 174. In other words, the membrane 171 can be torn away from the cover 164 by plastically deforming the ductile portion 176 along the perforation 173. The perforation 173 defines a tear line TL for removing the membrane 171. The membrane 171 may be frangibly connected to the cover 164 via the tear line TL.

This disclosure is not necessarily limited to electric vehicle battery enclosure assemblies. Other electric vehicle components may benefit from the service panels described above, including but not limited to, motor inverter/converter systems. In addition, the teachings of this disclosure may be applicable to non-automotive components including any component in which it is desirable to provide access to a serviceable part inside the component.

Figure 7:
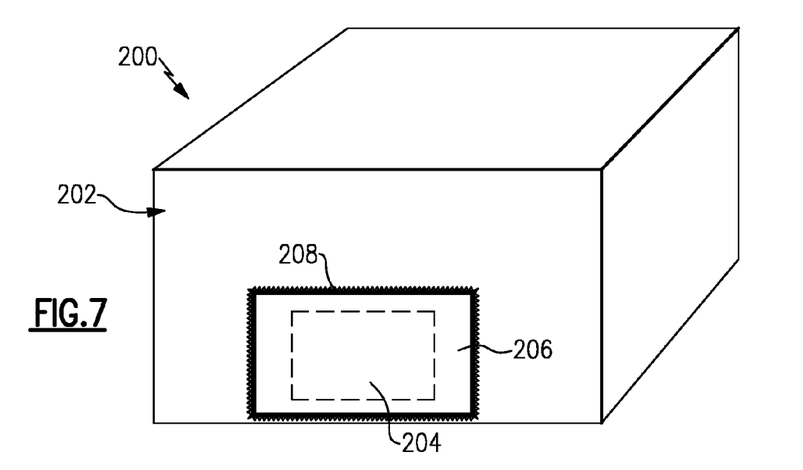
FIG. 7 illustrates an enclosure assembly having a service panel for accessing at least one serviceable part housed within the enclosure assembly.

For example, FIG. 7 illustrates an exemplary enclosure assembly 200. The enclosure assembly 200 includes a housing 202 containing at least one serviceable part 204. A service panel 206 is integrally formed in the housing 202. The service panel 206 provides selective access to the serviceable part 204.

In one embodiment, the service panel 206 includes a ductile portion 208 that can be plastically deformed to expose the serviceable part 204. The ductile portion 208 could include a tear strip similar to that described in FIGS. 2 and 3, a perforated membrane similar to the one taught in FIG. 6, or any other molded-in release feature that permits non-reversible removal of at least a portion of the service panel 206 to expose the serviceable part(s) 204.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:
1. A battery assembly, comprising:
an enclosure assembly defining an interior; and a service panel integrally formed in said enclosure assembly, wherein said service panel includes a ductile portion that is removable to access said interior, said ductile portion circumscribing a perimeter of a body of said service panel.

2. The battery assembly as recited in claim 1, wherein said interior accommodates at least one serviceable part.

3. The battery assembly as recited in claim 1, wherein said enclosure assembly includes a tray made of a first material and a cover made of a second material different from said first material.

4. The battery assembly as recited in claim 3, wherein said first material is a metal and said second material is a thermoplastic.

5. The battery assembly as recited in claim 1, wherein said ductile portion includes a tear strip.

6. The battery assembly as recited in claim 5, comprising a pull tab connected to said tear strip.

7. The battery assembly as recited in claim 5, wherein said service panel includes a center body that is bounded by said tear strip.

8. The battery assembly as recited in claim 1, wherein said ductile portion includes a perforation.

9. The battery assembly as recited in claim 1, comprising a replacement panel configured to reseal said interior after removal of at least said ductile portion.

10. The battery assembly as recited in claim 1, wherein said ductile portion is irreversibly removable from said enclosure assembly.

11. A battery assembly, comprising:
an enclosure assembly defining an interior; and
a service panel integrally formed in said enclosure assembly, wherein said service panel includes a ductile portion that is removable to access said interior, said ductile portion including a tear strip defined by a first groove and a second groove that are molded into a portion of said enclosure assembly.

12. A battery assembly, comprising:
an enclosure assembly defining an interior; and
a service panel integrally formed in said enclosure assembly, wherein said service panel includes a ductile portion that is removable to access said interior, said ductile portion including a perforation that circumscribes an outer periphery of a membrane of said service panel.

13. An enclosure assembly, comprising:
a housing containing at least one serviceable part;
a service panel integrally formed into said housing; and
said service panel having a ductile portion that is plastically deformable to expose said at least one serviceable part, said ductile portion circumscribing a perimeter of a body of said service panel.

14. The assembly as recited in claim 13, wherein said ductile portion is irreversibly removable from said housing.

15. The assembly as recited in claim 13, wherein said enclosure assembly is a battery assembly of an electric vehicle.

16. The assembly as recited in claim 13, wherein said ductile portion includes a tear strip.

17. A method, comprising:
deforming a ductile portion of a service panel of an enclosure assembly by applying a pulling force to the ductile portion, wherein deforming the ductile portion includes severing a tear strip from the enclosure assembly or tearing a membrane away from the enclosure assembly along a perforation; and
exposing at least one serviceable part housed inside of the enclosure assembly in response to deforming the ductile portion.

18. The method as recited in claim 17, comprising the step of:
prior to deforming the ductile portion, determining whether the at least one serviceable part requires servicing.

19. The method as recited in claim 17, comprising the step of:
replacing at least a portion of the service panel with a replacement panel.

* * * * *